(12) United States Patent
Douguet et al.

(10) Patent No.: US 8,619,977 B2
(45) Date of Patent: *Dec. 31, 2013

(54) REPRESENTATION CHANGE OF A POINT ON AN ELLIPTIC CURVE

(75) Inventors: Michel Douguet, Marseilles (FR); Vincent Dupaquis, Biver (FR)

(73) Assignee: Inside Secure, Aix-en-Provence Cedex (FR)

( * ) Notice: Subject to any disclaimer, the term of this patent is extended or adjusted under 35 U.S.C. 154(b) by 820 days.

This patent is subject to a terminal disclaimer.

(21) Appl. No.: 12/028,427

(22) Filed: Feb. 8, 2008

(65) Prior Publication Data

US 2009/0180611 A1  Jul. 16, 2009

Related U.S. Application Data

(60) Provisional application No. 61/021,158, filed on Jan. 15, 2008.

(51) Int. Cl.
   *H04K 1/00* (2006.01)
(52) U.S. Cl.
   USPC ............... 380/30; 380/28; 708/250; 708/492; 708/620
(58) Field of Classification Search
   USPC ........................................................ 380/30
   See application file for complete search history.

(56) References Cited

U.S. PATENT DOCUMENTS

| | | | |
|---|---|---|---|
| 6,366,673 B1 | 4/2002 | Hollmann et al. | |
| 6,873,706 B1 * | 3/2005 | Miyazaki et al. | 380/30 |
| 6,876,745 B1 * | 4/2005 | Kurumatani | 380/28 |
| 7,046,801 B2 | 5/2006 | Okeya | |
| 7,162,033 B1 | 1/2007 | Coron | |
| 2003/0156714 A1 * | 8/2003 | Okeya | 380/30 |
| 2004/0228478 A1 | 11/2004 | Joye | |
| 2005/0105723 A1 | 5/2005 | Dupaquis et al. | |
| 2005/0152541 A1 | 7/2005 | Takenaka et al. | |
| 2005/0169462 A1 | 8/2005 | Jung et al. | |
| 2005/0195973 A1 * | 9/2005 | Ibrahim | 380/28 |
| 2006/0029221 A1 * | 2/2006 | Ibrahim | 380/28 |
| 2006/0045262 A1 * | 3/2006 | Orlando | 380/28 |

(Continued)

FOREIGN PATENT DOCUMENTS

WO   WO2006124160   11/2006

OTHER PUBLICATIONS

Performance evaluation of a new coordinate system for elliptic curves, Bernstein, Daniel, Lange, Tanja, May 22, 2007.*

(Continued)

*Primary Examiner* — Ashok Patel
*Assistant Examiner* — Gary Gracia
(74) *Attorney, Agent, or Firm* — Panitch Schwarze Belisario & Nadel LLP (57) ABSTRACT

An elliptic curve cryptographic system where point coordinates are transformed from a first coordinate system to a second coordinate system. The transformed coordinates are processed by field operations, which have been modified for operating on the transformed point coordinates. In some implementations, the point coordinates are transformed from an affine coordinate system to a projective coordinate system using a non-random value for the projective coordinate. In some implementations, the transformed projective representation of the point can be changed from a first representation of the point in projective coordinates to a second representation of the point in projective coordinates, where the projective coordinate used in the representation change is a random value.

25 Claims, 5 Drawing Sheets

(56) References Cited

U.S. PATENT DOCUMENTS

| | | | |
|---|---|---|---|
| 2006/0093137 A1* | 5/2006 | Izu et al. | 380/30 |
| 2006/0098814 A1* | 5/2006 | Al-Khoraidly et al. | 380/28 |
| 2006/0280296 A1* | 12/2006 | Vasyltsov et al. | 380/28 |
| 2007/0055879 A1 | 3/2007 | Luo et al. | |
| 2007/0064931 A1* | 3/2007 | Zhu et al. | 380/30 |
| 2007/0083586 A1 | 4/2007 | Luo et al. | |
| 2007/0162530 A1 | 7/2007 | Dhem | |
| 2007/0177721 A1* | 8/2007 | Itoh et al. | 380/28 |
| 2008/0019509 A1* | 1/2008 | Al-Gahtani et al. | 380/30 |
| 2008/0025500 A1* | 1/2008 | Izu et al. | 380/28 |
| 2008/0095357 A1* | 4/2008 | Kitamura et al. | 380/28 |
| 2008/0205638 A1* | 8/2008 | Al-Gahtani et al. | 380/30 |
| 2008/0273695 A1* | 11/2008 | Al-Gahtani et al. | 380/30 |
| 2009/0074179 A1* | 3/2009 | Futa et al. | 380/28 |

OTHER PUBLICATIONS

Notification Concerning Transmittal of International Preliminary Report on Patentability for PCT/US2009/030869, dated Jul. 29, 2010, 7 pages.

Joye, M. (2003). "Elliptic Curves and Side-Channel Attacks" Séminaire de Cryptographic, Rennes, p. 1-7 [on-line]. [Retrieved from the internet <URL http://www.gemplus.com/smart/>.

Coron, J.-S. (1999). "Resistance Against Differential Power Analysis for Elliptic Curve Crytosystems", Cryptographic Hardware and Embedded Systems. Lecture Notes in Computer Science, vol. 1717, pp. 292-302, 1999 [Retrieved from the internet <URL http://www.gemplus.com/smart/rd/publications/pdf/Cor99dpa.pdf>.

Dupuy, W. & Kunz-Jacques, S. (2005). "Resistance of Randomized Projective Coordinates Against Power Analysis" DCSSI Crypto Lab, Paris, France.

U.S. Appl. No. 12/033,512, filed Feb. 19, 2008, Douguet et al.

Cohen et al., "Efficient Elliptic Curve Exponentiation Using Mixed Coordinates." Internat. Conf. on the Theory and Appl. of Cryptology and Infor. Security, pp. 51-65, 1988.

Okeya and Sakurai, "Power Analysis Breaks Elliptic Curve Cryptosystems Even Secure Against the Timing Attack." Prog in Cryptology-Indocrypt, Inter Conf Incrypt, 178-190, 2000.

Joye et al., "Protections Against Differential Analysis for Elliptic Curve Cryptography—An Algebraic Approach-." Cryptographic Hardware & Embedded Sys., 377-390, 2001.

Crandall J & Papadopoulous J. "On the Implementation of AKS-class primality tests." (9 pages) 2003 [Retrieved from internet <URL http://www.apple.com/acg/pdf/aks3.pdf>.

Phatak et al., "Fast Modular Reduction for Large Wordlengths via One Linear and One Cyclic Convolution." Computer Arithmetic, 17th IEEE Symposium on Cape COD, 179-186, 2005.

Deschamps, J-P & Sutter, G. "Comparison of FPGA Implementation of the Mod M Reduction." Latin American Applied Research, 93-97, 2007.

Dhem, J-F, "Modular Multiplication." Design of an Efficient Public-Key Cryptographic Library for RISC-based Smart Cards, Chapter 2, pp. 11-56, 2008.

Hasenplaugh, W. "Fast Modular Reduction." Computer Arithmetic, 225-229, 18th IEEE Symposium on Computer Arithmetic 2007.

"Efficient Implementation" USC Computer Science Department, unknown date.

Atmel Corporation, International Search Report and the Written Opinion of the corresponding PCT application No. PCT/US2009/030867 (14 pages) dated May 8, 2009.

Notification Concerning Transmittal of International Preliminary Report on Patentability for PCT/US2009/030867, filed Jul. 29, 2010, 7 pages.

* cited by examiner

REPRESENTATION CHANGE OF A POINT ON AN ELLIPTIC CURVE

The Application claims the benefit of priority of U.S. Provisional Application Ser. No. 61/021,158, filed on Jan. 15, 2008, the entire disclosure of which is incorporated herein by reference.

TECHNICAL FIELD

The subject matter of this application is generally related to elliptic curve cryptography (ECC).

BACKGROUND

ECC systems are subject to "side-channel" attacks (e.g., power analysis attacks, differential power analysis) that exploit information leaked into the operating environment of a device while the device executes cryptographic algorithms. For example, a hacker may monitor the power consumed or the electromagnetic radiation emitted by a device (e.g., a smart card), while it performs private-key operations such as decryption and signature generation. The hacker may also measure the time it takes to perform a cryptographic operation, or analyze how a cryptographic device behaves when certain errors are encountered. Some conventional countermeasures to side-channel attacks insert "dummy" cryptographic operations (e.g., doubling, addition), so that the operations cannot be distinguished from each other when viewed on a power trace, for example. Inserting additional "dummy" operations, however, slows down the overall cryptographic process, which may be unacceptable for certain applications.

SUMMARY

In an elliptic curve cryptographic system, point coordinates are transformed from a first coordinate system to a second coordinate system. The transformed coordinates are processed by field operations, which have been modified for operating on the transformed point coordinates. In some implementations, the point coordinates are transformed from an affine coordinate system to a projective coordinate system using a non-random value for the projective coordinate. In some implementations, the non-random value can be a predetermined value based on an optimization of the calculations used to transform the point coordinates from a first coordinate system to a second coordinate system.

In some implementations, the transformed projective representation of the point can be changed from a first representation of the point in projective coordinates to a second representation of the point in projective coordinates, where the projective coordinate used in the representation change is a random value.

Other implementations of representation change of a point on an elliptic curve are disclosed, including implementations directed to systems, methods, processes, apparatuses and computer-readable mediums.

DETAILED DESCRIPTION

Example Cryptographic System & Process

Figure 1:
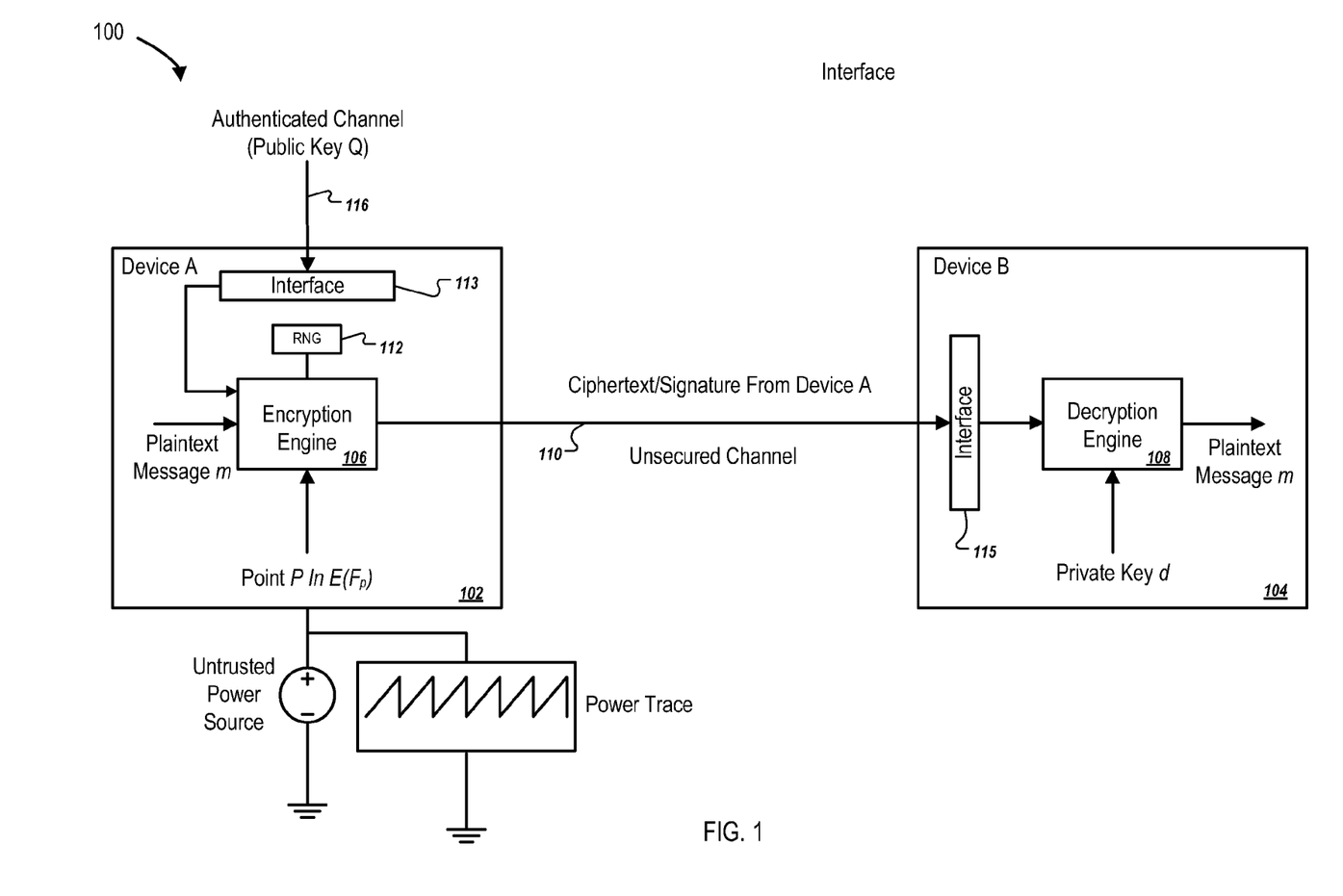
FIG. 1 is a block diagram of an implementation of a public-key cryptographic system.

FIG. 1 is a block diagram of an implementation of a public key cryptographic system 100. The system 100 includes device 102 ("Device A") and device 104 ("Device B"). In the example shown, device 102 can communicate with device 104 over an unsecured channel 110 and an interface 113. For example, device 102 can send a message or digital signature over the unsecured channel 110 to device 104. Devices 102 and 104 can be any device capable of performing cryptographic processes, including but not limited to: a personal computer, a mobile phone, an email device, a game console, a personal digital assistant (PDA), a media player, a storage device, etc. An unsecured channel 110 can be any communication medium, including but not limited to: radio frequency (RF) carriers, optical paths, circuit paths, networks (e.g., the Internet), etc.

In some implementations, the device 102 includes an encryption engine 106 and a random number generator 112. The random number generator 112 can generate true random numbers (e.g., generated from a physical process) or pseudo random numbers (e.g., generated from an algorithm). In other implementations, the random numbers are received through the interface 113 or are stored on the device 102 (e.g., in memory).

In some implementations, the device 104 includes a decryption engine 108 for decrypting ciphertext or digital signatures received from device 102 through interface 115. The devices 102 and 104 can include encryption and decryption engines, 106, and 108, for bidirectional communication. In the example shown, the devices 102, 104, can perform a variety of cryptographic processes, including but not limited to: elliptic curve encryption/decryption, elliptic curve digital signature generation and authentication, etc. Although the cryptographic processes described herein are related to elliptic curves, the disclosed implementations can be used with any cryptographic processes that perform field operations where it is desirable to mask secret material that could be derived from analyzing the operating environment of the field operations.

In some implementations, the same domain parameters (e.g., selected curve, group order, etc.) are shared by both devices 102, 104.

In some implementations, device 102 can be a smart card that is in the process of authenticating its holder to device 104, which can be a mainframe computer located at a bank, for example. A smart card, which may also be referred to as a chip card or an integrated circuit card (ICC), is generally a pocket sized card (e.g., a credit card sized card) that can include embedded integrated circuits that hold and/or process information. The smart card may also include specific security logic. The stored and/or processed information can be secure information specific to its holder (e.g., a bank account number) that can be used to process a requested transaction by the user (e.g., a withdrawal from their bank account). The security logic can be used to protect the transmission of the user specific information between device 102 and device 104.

In some cases, a hacker may monitor the communications between device 102 and device 104 by eavesdropping on the unsecured channel 110. The hacker may have the capability to read all data transmitted over the channel, to modify transmitted data, and to inject other data into the transmission for their own benefit. For example, the hacker may attempt to read a message from sending device 102 to receiving device 104 to obtain personal information about the sender of the message (e.g., bank account number, credit card number, etc.). The hacker may also attempt to impersonate either device 102 or device 104 in the communication channel to perform certain activities that would be requested or performed by either device (e.g., withdraw money from a bank account, order merchandise to be charged to a credit card, etc.).

In other cases, a hacker may try to analyze the operating environments of the devices 102 and 104 to determine secret keying material. These attacks are often referred to as "side-channel" attacks. Some examples of side-channel attacks include power analysis attacks (e.g., simple or differential) and electromagnetic analysis attacks.

Power analysis attacks measure power consumption of a cryptographic device, such as a smart card that draws power from an external, untrusted source. Secret keying material can be determined directly by examining a power trace from a single secret key operation. Elliptic curve point multiplication algorithms are particularly vulnerable to these types of attacks because formulas for adding and doubling points may have power traces which can be distinguished from other operations.

Electromagnetic analysis attacks measure electromagnetic (EM) signals induced by the flow of current through CMOS devices, which can be collected by placing a sensor close to the device while the device is performing cryptographic operations. The EM signals can be analyzed to determine which instructions are being executed and to determine the contents of data registers.

Therefore, a need may arise for secure communications between device 102 and device 104, and for securing the operating environments of devices 102 and 104. The former can be defended against using known encryption techniques. The latter can be defended against using elliptic curve point transformations, used alone or combined with exponent masking and additive exponent decomposition techniques, as described in reference to FIGS. 2-4.

Elliptic Curve Key Generation

In some implementations, cyclic subgroups of elliptic curve groups that form an additive abelian group can be used to implement the public key cryptographic system 100 based on a discrete logarithm problem. In this implementation, an elliptic curve, E, can be defined over a finite field of integers, $F_p$. A point, P, in $E(F_p)$ can have a prime order, n. The cyclic subgroup of $E(F_p)$ generated by point P can be defined by the following equation:

$$(P) = \{O, P, 2P, 3P, \ldots (n-1)P\},$$

where O is the point at infinity and the identity element.

In this implementation, the prime number, p, the equation of the elliptic curve, E, (e.g., the values of a and b in equation $y^2 = x^3 + ax + b$), the point, P, and the order, n, can be the public domain parameters. A private key, d, can be a random integer selected from the interval [1, n−1], and a corresponding public key, Q, can be calculated as: Q=d.P, where point, P, is multiplied by the private key, d, an integer, using elliptic curve point multiplication, which can be denoted by the operator ".". For example, let A be a point on an elliptic curve. An integer, j, can be multiplied with the point A to obtain another point B on the same elliptic curve. Point multiplication can be represented by the equation: B=j.A. In some implementations, point multiplication can be performed using point addition and point doubling repeatedly to find the result. For example, if j=23, then j.A=23.A=2(2(2(2*A)+A)+A)+A, where "*" represents integer multiplication.

The problem of determining the private key, d, given the domain parameters (p, E, P, and n) and public key, Q, is referred to as the elliptic curve discrete logarithm problem (ECDLP).

Examples of Elliptic Curve Cryptographic Processes

Techniques will now be described for performing elliptic curve point transformations in well-known elliptic curve cryptographic processes. These techniques, however, can be used in any cryptographic processes or applications where it is desirable to mask secret keying material.

ElGamal Cryptographic Processes

In some implementations, the public key cryptographic system 100 can use an elliptic curve analogue of ElGamal encryption and decryption processes. For example, a public key, Q, can be the public key of device 104, the receiving device. Device 102, the sending device, can acquire the public key, Q, from device 104 over authenticated channel 116. A plaintext message m can be represented as a point, M, in a finite field of integers $E(F_p)$. Encryption engine 106 can compute ciphertext $C_1$, where $C_1$ is a point on $E(F_p)$, using the following equation:

$$C_1 = k.P,$$

where k is a random number selected by device 102 from the interval [1, (n−1)], and P is a point in $E(F_p)$ and is a domain parameter.

Encryption engine 106 can also compute ciphertext $C_2$, where $C_2$ is a point in $E(F_p)$, using the following equation:

$$C_2 = M + k.Q,$$

where M is the point representation of the plaintext message m, k is a random number selected by device 102 from the interval [1, (n−1)], and Q is the point representation of the public key of device 104, where point Q is in $E(F_p)$.

The ciphertext pair of points ($C_1$, $C_2$) can be transmitted by device 102 to device 104 over unsecured channel 110. Device 104, using decryption engine 108 and its private key d, can recover the plaintext message m from the ciphertext pair of points ($C_1$, $C_2$) using the following equation:

$$M = C_2 - d.C_1,$$

where M is the point representation of the plaintext message m, d is the private key of device 104, and plain text message m can be extracted from M.

A hacker analyzing the operating environments of the devices 102, 104 would need to compute k.Q, since $d.C_1 = k.Q$. The task of computing k.Q from the domain parameters (e.g., p, E, P, n), public key Q, and $C_1 = k.P$ can be referred to as the elliptic curve analogue of the Diffie-Hellman problem. Since Q is a public domain parameter, the hacker need only determine the exponent k from the operating environment to recover the plaintext message m. Thus, it is desirable to protect the exponent k from side-channel attacks.

Elliptic Curve Point Operations

One of the main operations in elliptic curve cryptography can be point multiplication. As previously described, a point multiplication operation can be performed using point addition and point doubling operations repeatedly to find the result. Each point addition and point doubling operation can include a multiplicative inverse operation. In some implementations, the inverse operation can have an execution speed orders of magnitude slower than an addition or multiplication operation. In some implementations, representing points in a projective coordinate system can eliminate the use of the multiplicative inverse operation in point addition and point doubling operations. This can result in an increase in the efficiency of the point multiplication operation.

Elliptic Curve Fields

An elliptic curve group can be defined over a prime field ($F_p$), a binary field ($F_{2^m}$), or an extension field ($F_{p^m}$). In an elliptic curve group, an integer, p, can be a prime number, and $F_p$ can denote a field of integers modulo p, where $F_p = \{0, 1, 2, \ldots, p-1\}$.

In some implementations, an elliptic curve can be on a prime field (E over field, $F_p$), and can be defined by the elliptic curve equation:

$$y^2 = x^3 + ax + b$$

where a, b∈$F_p$ satisfy the equation:

$$4a^3 + 27b^2 \neq 0 \pmod{p}.$$

A pair, (x, y), where both x and y are elements of $F_p$, can be the coordinates of a point, P, on the elliptic curve E, if (x, y) can be used to solve the elliptic curve equation. A point at infinity, O, can also be located on the elliptic curve E. The set of all points on the elliptic curve E can be denoted as $E(F_p)$.

In some implementations, the equation of an elliptic curve can be on a binary field, $F_{2^m}$. The equation can be defined by the elliptic curve equation:

$$y2 + xy = x^3 + ax^2 + b, \text{ where } b \neq 0.$$

In this implementation, the elements of the finite field can be integers that have a length of, at most, m bits. The elements can be considered as a binary polynomial of degree m−1. Polynomial arithmetic can be used for addition, multiplication, division, and subtraction operations.

In some implementations, the equation of the elliptic curve can be on an extension field, $F_{p^m}$, where m>=2 and p is a prime number.

Coordinate Systems in Elliptic Curve Cryptography

An elliptic curve can be represented with respect to more than one coordinate system. In some implementations, points on an elliptic curve can be represented in the affine coordinate system. In some implementations, points on an elliptic curve can be represented in a projective coordinate system, which will be described in more detail below. In some implementations, points on an elliptic curve can be represented in a redundant coordinate system, where additional coordinates can be included with the point coordinates in an affine or projective coordinate system.

A point P on an elliptic curve can be represented in affine coordinates (e.g., P=(x, y)). In some implementations, a point P can also be represented in projective coordinates, where the affine point P=(x, y) can be represented with powers c and d that can define an equivalence class. For example, class (x:y:z)={$(a^c)*x, (a^d)*y, a*z$}. In some implementations, a point P can also be represented in redundant coordinates, for example Chudnovsky projective coordinates, where the point P can be represented by coordinates (x, y, z, $z^2$, $z^3$).

For example, a point on an elliptic curve, P, represented by affine coordinates (e.g., x1, y1), can be converted to projective coordinates (e.g., x1, y1, z1) in a projective coordinate system. A point multiplication operation which can include multiple point addition operations, as described above, can be performed on point P, and when complete, point P can be converted back to affine coordinates.

Representation of a Point in a Binary Field in Projective Coordinates

In some implementations, points on an elliptic curve on a binary field ($F_{2^m}$) can be represented by standard projective coordinates. In this implementation, the powers that define an equivalence class, c and d, can be set such that c=1 and d=1. For example, the point (x, y, z) in projective coordinates can correspond to the point (x/z, y/z) in affine coordinates. The equation for the elliptic curve on a binary field represented in standard projective coordinates can be:

$$y^2z + xyz = x^3 + ax^2z + bz^3.$$

For example, for a point multiplication operation, the point (x, y) in affine coordinates can be converted to the point (x, y, z) in projective coordinates. After a point multiplication operation, the result (x, y, z) can be converted back to affine coordinates as (x/z, y/z) where z is not equal to zero. If z=0, the point can then be considered as the point at infinity, O.

In some implementations, points on an elliptic curve on a binary field ($F_{2^m}$) can be represented by Jacobian projective coordinates. In this implementation, the powers that define an equivalence class, c and d, can be set such that c=2 and d=3. For example, the point (x, y, z) in projective coordinates can correspond to the point ($x/z^2$, $y/z^3$) in affine coordinates. The equation for the elliptic curve on a binary field represented in Jacobian projective coordinates can be:

$$y^2z + xyz = x^3 + ax^2z^2 + bz^6.$$

For example, for a point multiplication operation, the point (x, y) in affine coordinates can be converted to the point (x, y, z) in projective coordinates. After a point multiplication operation, the result (x, y, z) can be converted back to affine coordinates as ($x/z^2$, $y/z^3$) where z is not equal to zero. If z=0, the point can then be considered as the point at infinity, O.

In some implementations, points on an elliptic curve on a binary field ($F_{2^m}$) can be represented by López-Dahab (LD) projective coordinates. In this implementation, the powers that define an equivalence class, c and d, can be set such that c=1 and d=2. For example, the point (x, y, z) in projective coordinates can correspond to the point (x/z, $y/z^2$) in affine coordinates. The equation for the elliptic curve on a binary field represented in LD projective coordinates can be:

$$y^2 + xyz = x^3z + ax^2z^2 + bz^4.$$

For example, for a point multiplication operation, the point (x, y) in affine coordinates can be converted to the point (x, y, z) in projective coordinates. After a point multiplication operation, the result (x, y, z) can be converted back to affine coordinates as (x/z, $y/z^2$) where z is not equal to zero. If z=0, the point can then be considered as the point at infinity, O.

Representation of a Point in a Prime Field by Projective Coordinates

In some implementations, points on an elliptic curve in a prime field (Fp) can be represented by standard projective coordinates. In this implementation, the powers that define an equivalence class, c and d, can be set such that c=1 and d=1. For example, the point (x, y, z) in projective coordinates can correspond to the point (x/z, y/z) in affine coordinates. The equation for the elliptic curve on a prime field represented in standard projective coordinates can be:

$$y^2z = x^3 - 3x^2z + bz^3.$$

For example, for a point multiplication operation, the point (x, y) in affine coordinates can be converted to the point (x, y, z) in standard projective coordinates. After point multiplication, the result (x, y, z) can be converted back to affine coordinates as (x/z, y/z) where z is not equal to zero. If z=0, the point can then be considered as the point at infinity, O.

In some implementations, points on an elliptic curve in a prime field ($F_p$) can be represented by Jacobian projective coordinates. In this implementation, the powers that define an equivalence class, c and d, can be set such that c=2 and d=3. For example, the point (x, y, z) in Jacobian projective coordinates can correspond to the point ($x/z^2$, $y/z^3$) in affine coordinates. The equation of an elliptic curve on a prime field represented in Jacobian projective coordinates can be:

$$y^2 = x^3z - 3xz^4 + bz^6.$$

For a point multiplication operation, the point (x, y) in affine coordinates can be converted to the point (x, y, z) in Jacobian projective coordinates. After point multiplication, the result (x, y, z) can be converted back to affine coordinates as ($x/z^2$, $y/z^3$) where z is not equal to zero. If z=0, the point can then be considered as the point at infinity, O.

In some implementations, points on an elliptic curve in a prime field ($F_p$) can be represented by redundant coordinates. For example, the point (x, y, z, $z^2$, $z^3$) in Chudnovsky projective coordinates can correspond to the point ($x/z^2$, $y/z^3$) in affine coordinates. A Jacobian projective coordinate point (x, y, z) can also be represented by Chudnovsky coordinates in a redundant representation. The equation of an elliptic curve on a prime field represented in Chudnovsky projective coordinates can therefore be:

$$y^2 = x^3z - 3xz^4 + bz^6.$$

For a point multiplication operation, the point (x, y) in affine coordinates can be converted to the point (x, y, z) in Chudnovsky projective coordinates. After a point multiplication operation, the result (x, y, z) can be converted back to affine coordinates as ($x/z^2$, $y/z^3$) where z is not equal to zero. If z=0, the point can then be considered as the point at infinity, O.

Elliptic Curve Point Transformation Process

Figure 2:
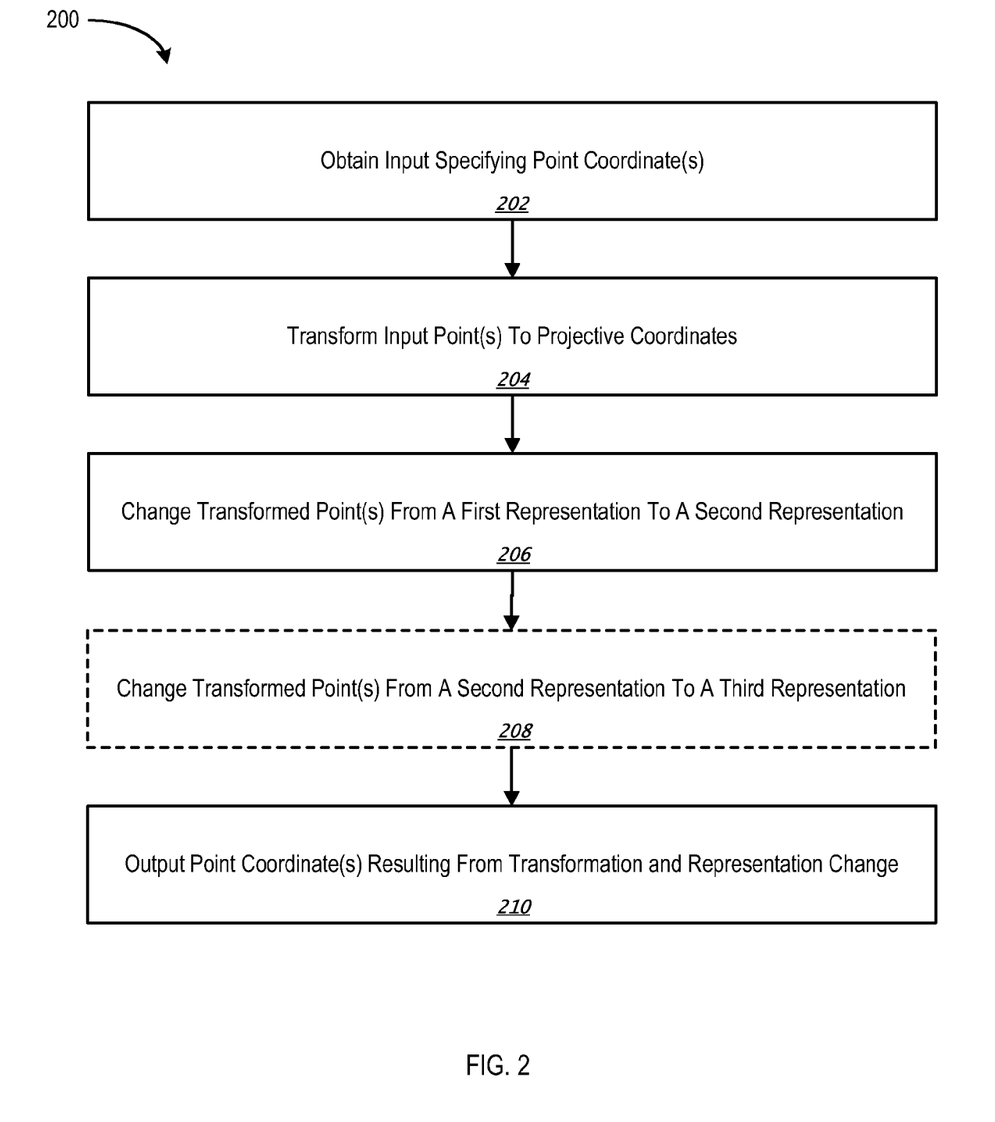
FIG. 2 is a flow diagram of an implementation of a transformation and representation change process for a point on an elliptic curve.

FIG. 2 is a flow diagram of an implementation of a transformation and representation change process 200 for a point on an elliptic curve. The process 200 can transform a point on an elliptic curve from affine to projective coordinates and change the projective coordinate representation of the point when performing point operations, which can include, but are not limited to, point multiplication, point addition, and point doubling. The process 200 can be performed on elliptic curves on a prime field ($F_p$), a binary field ($F_{2^m}$), and an extension field ($F_{p^m}$).

A point transformation can occur when a point is transformed from affine coordinates to projective coordinates. Examples of these transformations were described above for points in a prime field and a binary field. The transformed point, now in projective coordinates, can then undergo a representation change that can change the point to another projective coordinate representation. The representation change can change the intermediate projective coordinate values for a point P during point operations. Dependent upon the implementation, the representation change can be combined with the transformation of a point P from affine coordinates to projective coordinates, or the transformation of a point P from affine coordinates to redundant coordinates.

The transformation and representation change process 200 can be performed during a point operation (e.g., a point multiplication operation that can include point addition and point doubling). The process 200 can transform and change the representation of the coordinates of an input point, P, at a certain step in a point operation. The transformation of a point to projective coordinates and the representation change of the point to another projective coordinate representation can modify the calculations used in the point operation. Therefore, the point operations can be modified to produce the correct results in projective or redundant coordinates, if they were used.

In some implementations, a point A in a prime field ($F_p$) can be transformed into Jacobian projective coordinates. The point A(x, y) in affine coordinates can be transformed to the projective point A'(x', y', z') where:

$$x' = x * z_{fixed}^2,$$

$$y' = y * z_{fixed}^3,$$

$$z' = z_{fixed},$$

and $z_{fixed}$ can be equal to any non-random value not equal to zero. In some implementations, $z_{fixed}$ can be selected for ease of computations. For example, $z_{fixed}$ can be equal to 1. The transformed point A'(x, y, 1) can be the result of setting $z_{fixed}$ equal to 1. In another example, $z_{fixed}$ can be equal to −1. The transformed point A'(x, y, −1) can be the result of setting $z_{fixed}$ equal to −1. In some implementations, the value of $z_{fixed}$ may be a positive or negative value less than or greater than one.

In some implementations, the transformed point A'(x', y', z') may have its representation changed. For example, an affine point A transformed into Jacobian projective coordinates resulting in point A' can be have its projective coordinate representation changed to another projective coordinate representation resulting in the point A". The point A in affine coordinates can be represented as (x,y). The Jacobian projective coordinates transformed point can be represented as A'(x', y', z'), and the changed point can be represented as A"(x", y", z").

As described above, in some implementations, an affine point A in a prime field ($F_p$) can be transformed into Jacobian projective coordinates using a non-random value for $z_{fixed}$ resulting in the point A'. The projective coordinate point A' can be changed to another projective coordinate representation resulting in the point A"(x", y", z") where:

$$x'' = x'^* z_{random}^2 = x * z_{random}^2 * z_{fixed}^2,$$

$$y'' = y'^* z_{random}^3 = y * z_{random}^3 * z_{fixed}^3$$

$$z'' = z'^* z_{random} = z_{random} * z_{fixed},$$

and $z_{random}$ can be equal to any random value not equal to zero. For example, $z_{random}$ can be generated by the random number generator 112 of FIG. 1.

Changing the projective representation of a projective coordinate point from a first representation to a second representation can provide a countermeasure to "side-channel" attacks that can exploit information leaked into the operating environment of a device performing elliptic curve cryptographic algorithms. For example, a hacker monitoring the cryptographic operations of a device may have difficulty distinguishing operations from each other when multiple projective coordinate transformations and representation changes are performed as well as the use of a random number in the representation change process.

In some implementations, a point A in a prime field ($F_p$) can be transformed into Jacobian projective coordinates. The point A(x, y) in affine coordinates can be transformed to the projective point A'(x', y', z') where:

$$x'=x*z_{fixed}^2,$$

$$y'=y*z_{fixed}^3,$$

$$z'=z_{fixed},$$

In some implementations, the projective coordinate point A' can have its representation changed to another projective coordinate representation resulting in the point A"(x", y", z") where:

$$x''=x'*z_{INVfixed}^2=x*z_{fixed}^2*z_{INVfixed}^2,$$

$$y''=y'*z_{INVfixed}^3=y*z_{fixed}^3*z_{INVfixed}^3,$$

$$z''=z'*z_{INVfixed}=z_{fixed}*z_{INVfixed},$$

and $z_{INVfixed}$ can be equal to any non-random value not equal to zero. The representation of the projective coordinate point A" can have its representation changed yet again to another projective coordinate representation resulting in the point A'''(x''', y''', z''') where:

$$x'''=x''*z_{random}^2=x'*z_{INVfixed}^2*z_{random}^2=x*z_{fixed}^2*z_{INVfixed}^2*z_{random}^2,$$

$$y'''=y''*z_{random}^3=y'*z_{INVfixed}^3*z_{random}^3=y*z_{fixed}^3*z_{INVfixed}^3*z_{random}^3,$$

$$z'''=z''*z_{random}=z'*z_{INVfixed}*z_{random}=z_{fixed}*z_{INVfixed}*z_{random},$$

and $z_{random}$ can be equal to any random value not equal to zero. For example, $z_{random}$ can be generated by the random number generator 112 of FIG. 1. In some implementations, $z_{INVfixed}$ can be equal to the inverted value of $z_{fixed}$ (e.g., $z_{INVfixed}=(1/z_{fixed})=z_{fixed}^{-1}$).

In some implementations, $z_{INVfixed}$ can be equal to the inverted value of $z_{fixed}$ (e.g., $z_{INVfixed}=(1/z_{fixed})=z_{fixed}-1$). For example, values for $z_{fixed}$ can be selected to reduce the mathematical complexity of determining $z_{INVfixed}$. Reducing the mathematical complexity of the point transformation can reduce the time it takes to perform point operations which can affect the time it takes to perform the overall cryptographic process. In some implementations, $z_{fixed}$ can be equal to 1. In other implementations, $z_{fixed}$ can be equal to −1. Selecting either one of these values can simplify the calculation needed to determine $z_{INVfixed}$. In other implementations, congruencies of 1 or −1 may also be selected.

In some implementations, a point A in a prime field ($F_p$) can be transformed into Jacobian projective coordinates. The point A(x, y) in affine coordinates can be transformed to the projective point A'(x', −y', −z) where:

$$x'=x,$$

$$y'=y*-1,$$

$$z'=-1.$$

The projective coordinate point A' can have its representation changed to another projective coordinate representation resulting in the point, A"(x", y", z") where:

$$x''=x'*z_{random}^2=x*z_{random}^2,$$

$$y''=y'*z_{random}^3=y*z_{random}^3*-1,$$

$$z''=z'*z_{random}=z_{random}*-1,$$

and $z_{random}$ can be equal to any random value not equal to zero. For example, $z_{random}$ can be generated by the random number generator 112 of FIG. 1.

The implementations described above can also be used for points that can be transformed into different types of projective coordinates. In some implementations, the point A in a prime field ($F_p$) can be transformed into standard projective coordinates whose representation can then be changed. In some implementations, the point A in a prime field ($F_p$) can be transformed into Jacobian projective coordinates that can be represented with redundancy using Chudnovsky coordinates. The transformed point represented in Chudnovsky coordinates can then undergo representation changes.

In some implementations, the point A can be in a binary field ($F_{2^m}$). The transformation of the point A to the point A', and the representation change of the point A' to the point A", as well as the representation change of the point A" to the point, A''', can be performed as described in the previous implementations for a point in a prime field. In some implementations, the point A in a binary field ($F_{2^m}$) can be transformed into standard projective coordinates whose representation can then be changed. In some implementations, the point A in a binary field ($F_{2^m}$) can be transformed into LD projective coordinates whose representation can then be changed.

Referring again to FIG. 2, the transformation and representation change process 200 can begin by obtaining the input that can specify the point coordinates for the point operation to be performed (step 202). For example, a point doubling operation can add a point to itself using a point doubling operation that includes a single point and its coordinates as input. In another example, two different points can be added together using a point addition operation that includes two points and their coordinates for inputs. The input point(s) can be in affine coordinates in a prime field ($F_p$), a binary field ($F_{2^m}$), or an extension field ($F_{p^m}$).

The input point(s) can be transformed into projective coordinates (step 204). In the implementations described above, a point A was transformed into a point A'. An input point P can be transformed into projective coordinates, resulting in the point P' in a similar manner. Other input points can also be similarly transformed.

A representation change can be performed on each of the transformed input point(s) (step 206). This was shown in the implementations above, where a representation change to the point A' resulted in the point A". Similar representation changes can be performed on the point P'. For example, point addition can be performed using the resulting points that have undergone a transformation and representation change. Optionally, the point P" can undergo another representation change resulting in the point P''' (step 208). Next, the point coordinates obtained from the transformation and representation change can be output for use in, for example, other point operations (step 210). For example, the projective point coordinate values can be output and incorporated into subsequent point operations.

Elliptic Curve Encryption Process Using Point Transformations

Figure 3A:
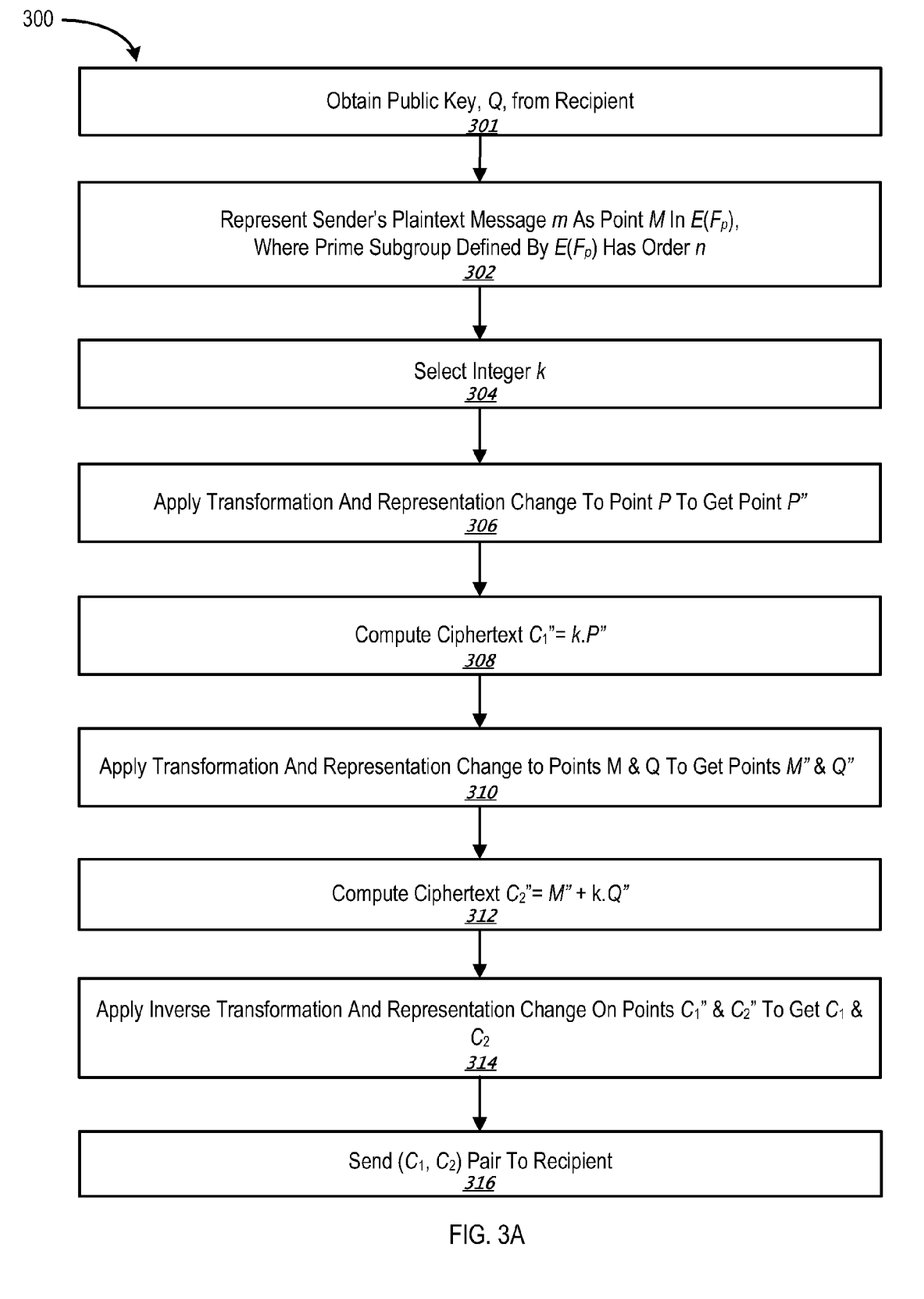
FIG. 3A is a flow diagram of an implementation of an elliptic curve encryption process using points that have undergone a transformation and representation change.

FIG. 3A is a flow diagram of an implementation of an elliptic curve encryption process 300 using points that have undergone a transformation and representation change as described in the process 200.

The process 300 begins with a sender obtaining a public key, Q, from a recipient over an authenticated channel between the sender and the recipient (step 301). The sender can represent its plaintext message m as a point M on an elliptic curve, E, which can be defined over a finite prime field, $F_p$, for example, where p is a prime number. The set of all points on the elliptic curve E can be denoted as $E(F_p)$, which defines a prime subgroup of order n (step 302). The sender can then select a random number k from the interval [1, (n−1)] (step 304).

As described with reference to FIG. 2, the input point P in an affine coordinate system can be transformed to a point P' in a projective coordinate system. The transformed point P' can undergo a representation change from a first representation to a second representation resulting in the point P" (step 306). Optionally, the point P' can undergo a representation change from the second representation to a third representation resulting in the point P'". The sender can then compute ciphertext point $C_1$" (step 308) using the following equation:

$$C_1"=k.P",$$

where k is a random number selected by the sender from the interval [1, (n−1)] and n is the order of the prime subgroup defined by $E(F_p)$.

The point M and the public key Q (also a point) can also undergo a transformation and representation change, as described with reference to FIG. 2, resulting in the points M" and Q", (step 310).

The sender can compute ciphertext point $C_2$" (step 312) using the following equation:

$$C_2"=M"+k.Q",$$

where n is the order of the prime subgroup defined by $E(F_p)$.

An inverse transformation and representation change process can be applied to points $C_1$" and $C_2$" to get the ciphertext pair of points $C_1$ and $C_2$ (step 314). This inverse process can be performed as the sender has knowledge of the fixed and random values used to perform the transformation and representation change for the points used to compute $C_1$" and $C_2$", as well as the projective coordinate system used for the transformation of the points.

The sender can transmit the ciphertext pair of points ($C_1$, $C_2$) to the recipient (step 316) over an unsecured channel between the sender and the recipient. The process 300 ends.

The implementation of FIG. 3A may be used with points represented in affine coordinates, projective coordinates, and redundant coordinates. The implementation of FIG. 3A may also be used with elliptic curves on a prime field ($F_p$), a binary field ($F_{2^m}$), or an extension field ($F_{p^m}$). Point transformations can be performed using the point representations on any of the elliptic curves using the implementations and examples described herein.

Elliptic Curve Decryption Process

Figure 3B:
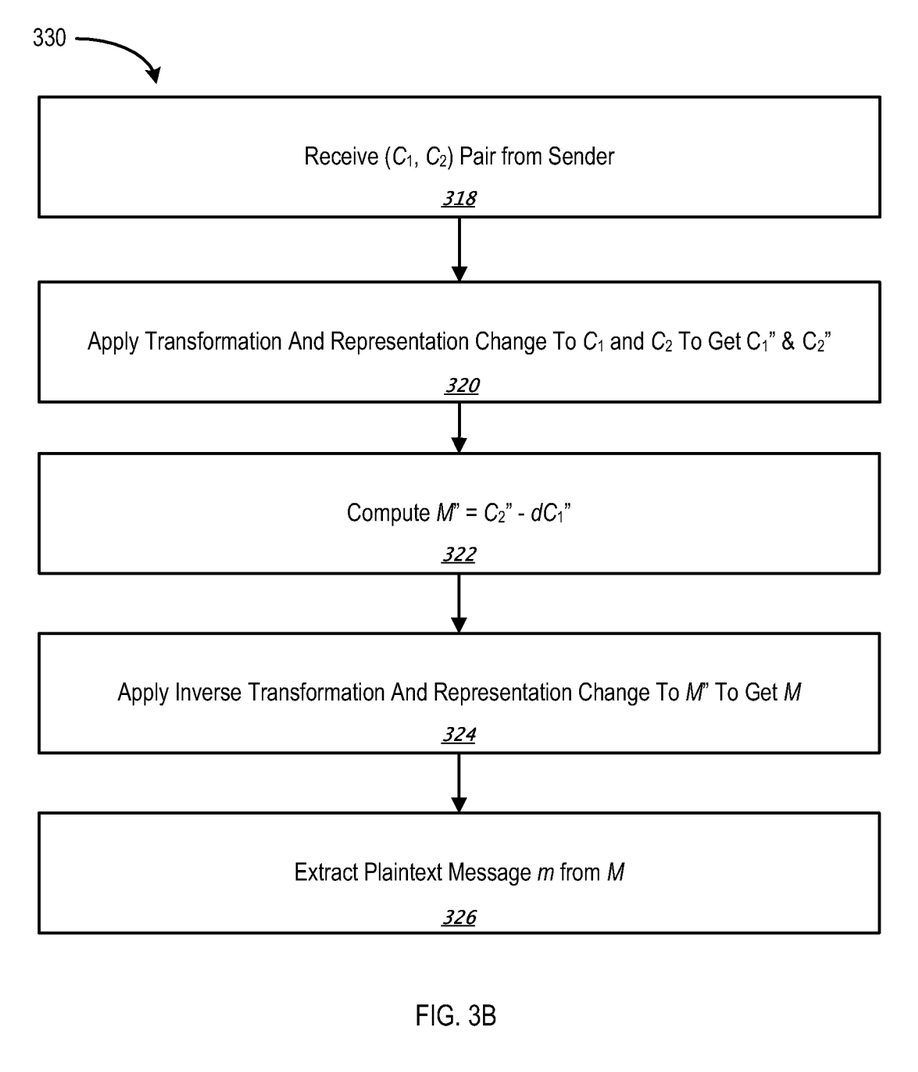
FIG. 3B is a flow diagram of an implementation of an elliptic curve decryption process using points that have undergone a transformation and representation change.

FIG. 3B is a flow diagram of an implementation of an elliptic curve decryption process 330 using points that have undergone a transformation and representation change as described in the process 200. The process 330 can be used as the decryption process for use with the elliptic curve encryption process 300.

The process 330 begins when the recipient receives the ciphertext pair of points ($C_1$, $C_2$) from the sender over an unsecured channel between the recipient and the sender (step 318). The recipient then applies a transformation and representation change to each of the points $C_1$ and $C_2$ to get $C_1$" and $C_2$" (step 320). The recipient then computes the point M" of a plaintext message (step 322) using the following equation:

$$M"=C_2"-d.C_1",$$

where M" is the point representation of the plaintext message m which is represented by transformation and representation changed projective coordinates and d is the private key of the recipient device.

The recipient, knowing the projective coordinate space of the transformed points $C_1$" and $C_2$", as well as the representation change of the point pair, therefore knows the transformation and representation change process that can be applied to the point M which is the point representation of the plaintext message m, to result in the point M". The recipient can apply the inverse transformation and representation change process to the point M", to obtain the point, M (step 324). This process is equivalent to the inverse transformation and representation process that was described above for point P". Knowing M, the recipient can then extract the plaintext message m from its point representation, M (step 326). The process 330 ends.

The foregoing processes implement point transformations in an ECC system. Other processes are possible, including processes with more or fewer steps (e.g., a digital signature generation and/or authentication process). The steps of the processes need not be performed serially in the order shown. The processes can be divided into multiple processing threads run by one or more processor cores and/or parallel processors.

System Architecture

Figure 4:
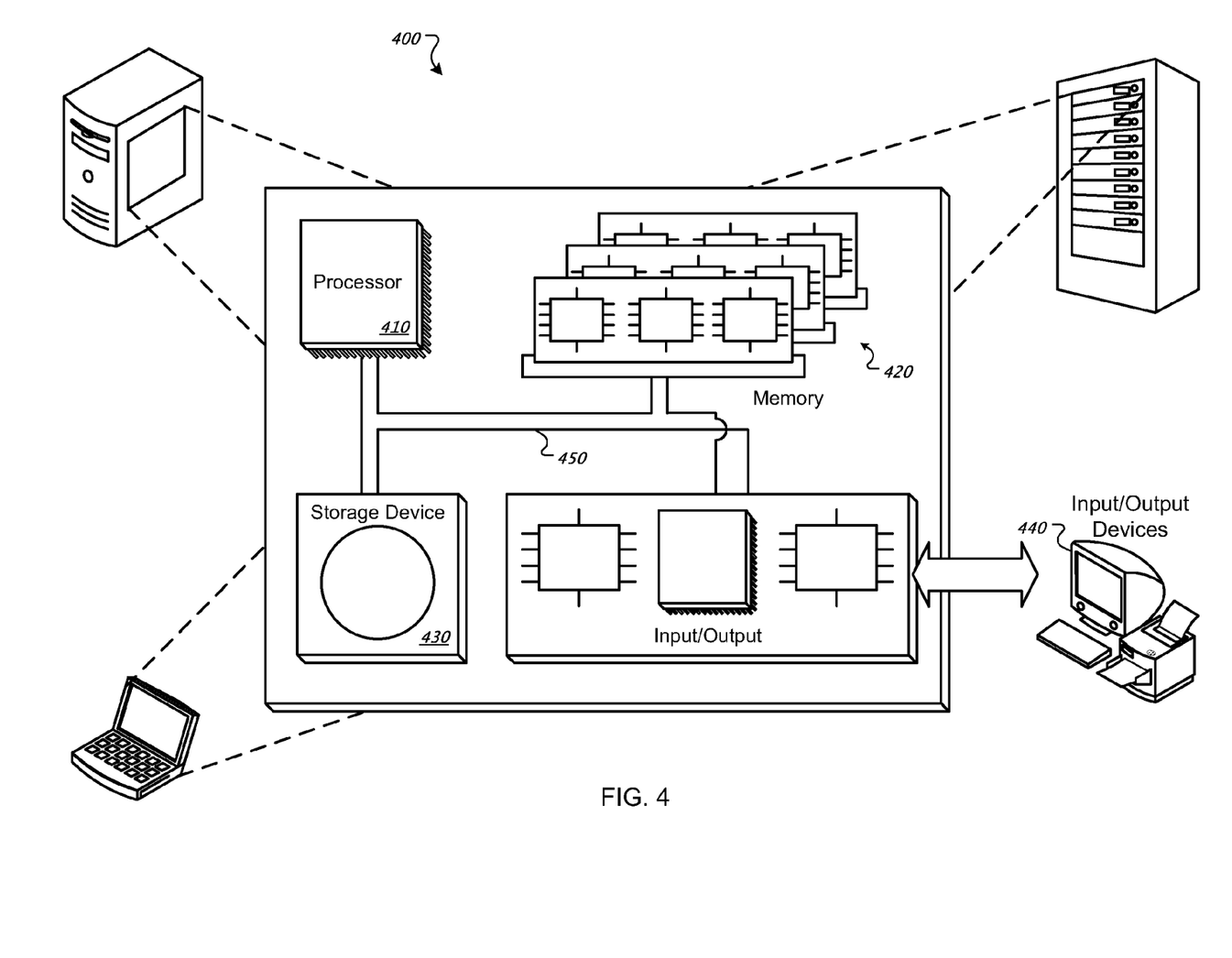
FIG. 4 is a block diagram of an implementation of a system for implementing the processes of FIGS. 2, 3A and 3B.

FIG. 4 is a block diagram of an implementation of a system for implementing the processes of FIGS. 2, 3A, and 3B. For example, the system 400 may be included in device 102 and/or in device 104, described in reference to FIG. 1. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In other implementations, the memory 420 is a volatile memory unit. In yet other implementations, the memory 420 is a non-volatile memory unit.

The storage device 430 is capable of providing mass storage for the system 400. In some implementations, the storage device 430 is a computer-readable medium. In various different implementations, the storage device 430 may be a floppy disk device, a hard disk device, an optical disk device, or a tape device.

The input/output device 440 provides input/output operations for the system 400. In some implementations, the input/output device 440 includes a keyboard and/or pointing device. In other implementations, the input/output device 440 includes a display unit for displaying graphical user interfaces.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method performed by a system including a processor and memory, the processor processing instructions stored in memory, the method comprising:
    obtaining input specifying one or more points on an elliptic curve defined over a finite prime field, each point having one or more coordinates in a first coordinate system, at least one point representing a plaintext message and at least one other point representing a cryptographic key;
    selecting a single first non-zero non-random value;
    transforming each coordinate of each point from the first coordinate system to a second coordinate system, wherein each coordinate of each transformed point in the second coordinate system has a first representation obtained by multiplying each coordinate of each transformed point in the first coordinate system by the single first non-random value raised to a non-zero integer power;
    generating a single random non-zero value;
    changing each transformed point in the second coordinate system from the first representation to a second representation, wherein each coordinate of each transformed point in the second representation is obtained by multiplying each coordinate of each transformed point in the first representation by the single random value raised to a non-zero integer power;
    performing one or more field operations on the second representation of each transformed point to obtain a second representation of ciphered points; and
    performing an inverse transformation and representation change on the second representation of each ciphered points, to obtain a ciphered message corresponding to the plaintext message.

2. The method of claim 1, where the transforming is performed using projective coordinates.

3. The method of claim 2, wherein the second coordinate system comprises Jacobian projective coordinates.

4. The method of claim 3, wherein the Jacobian projective coordinates are represented with redundancy using Chudnovsky coordinates.

5. The method of claim 1, where the second coordinate system has more coordinates than the first coordinate system.

6. The method of claim 1, where the second coordinate system has one more additional coordinate than the first coordinate system, the additional coordinate having a fixed value.

7. The method of claim 1, where the first non-random value is equal to one.

8. The method of claim 1, where the first non-random value is equal to negative one.

9. The method of claim 1, further comprising:
    selecting a single second non-zero non-random value; and
    changing each transformed point in the second coordinate system from the first representation into a third representation wherein each coordinate of each transformed point in the third representation is obtained by multiplying each coordinate of each transformed point in the first representation by the single second non-random value raised to a non-zero integer power, and wherein the transformation of each coordinate of each transformed point in the second representation is performed from each coordinate of each transformed point in the third representation.

10. The method of claim 9, wherein the second non-random value is the inversion of the first non-random value.

11. The method of claim 1, further comprising performing an elliptic curve encryption or decryption operation.

12. The method of claim 1, where the method is used in an elliptic curve digital signature generation or verification operation.

13. A method performed by a system including a processor and memory, the processor processing instructions stored in memory, the method comprising:
    obtaining input specifying one or more points on an elliptic curve defined over a finite prime field, each point having one or more coordinate in a first coordinate system, at least one point representing a plaintext message and at least one other point representing a cryptographic key;
    selecting a single first non-zero non-random value;
    transforming each coordinate of the one or more point into projective coordinates in a second coordinate system, wherein each coordinate of each transformed point in the second coordinate system has a first representation obtained by multiplying each coordinate of each transformed point in the first coordinate system by the single first non-random value raised to a non-zero integer power;
    generating a single non-zero random value;
    changing the projective coordinates in the second coordinate system from the first representation to a second representation, wherein each coordinate of each transformed point in the second representation is obtained by multiplying each coordinate of each transformed point in the first representation by the single random value raised to a non-zero integer power;
    performing one or more field operations on the second representation of each transformed point to obtain a second representation of ciphered points; and
    performing an inverse transformation and representation change on the second representation of each ciphered points, to obtain a ciphered message corresponding to the plaintext message.

14. The method of claim 13, where the second coordinate system has additional coordinates than the first coordinate system.

15. The method of claim 14, where the non-random values are equal to one.

16. The method of claim 14, where the non-random values are equal to negative one.

17. The method of claim 13, where the second coordinate system has one more additional coordinate than the first coordinate system, the additional coordinate having a fixed non-random value.

18. The method of claim 13, further comprising performing an elliptic curve encryption or decryption operation.

19. The method of claim 13, where the method is used in an elliptic curve digital signature generation or verification operation.

20. An apparatus comprising:
    (i) a processor; and
    (ii) a memory, the processor processing instructions stored in the memory, the processor operable for:
        (a) obtaining one or more points on an elliptic curve defined over a finite prime field, each having one or more coordinates in a first coordinate system, at least one point representing a plaintext message and at least one other point representing a cryptographic key
        (b) selecting a single first non-zero non-random value,
        (c) transforming each point from the first coordinate system to a projected point in a second coordinate system, wherein each coordinate of each projected point in the second coordinate system has a first representation obtained by multiplying each coordinate of each transformed point in the first coordinate system by the single first non-random value raised to a non-zero integer power,
        (d) generating a single non-zero random value,
        (e) transforming each projected point from the first representation to a second representation, wherein each coordinate of each transformed point in the second representation is obtained by multiplying each coordinate of each transformed point in the first representation by the single random value raised to a non-zero integer power,
        (f) performing one or more field operations on each projected point to obtain a second representation of ciphered points, and
        (g) performing an inverse transformation and representation change on the second representation of each ciphered points, to obtain a ciphered message corresponding to the plaintext message.

21. The apparatus of claim 20, where the second coordinate system has more additional coordinates than the first coordinate system.

22. The apparatus of claim 20, where the transforming is part of an elliptic curve encryption or decryption operation.

23. The apparatus of claim 20, where the transforming is part of an elliptic curve digital signature generation or verification operation.

24. The apparatus of claim 20, where the second coordinate system has one more additional coordinate than the first coordinate system, the additional coordinate having a fixed non-random value.

25. Software stored in computer readable storage device having instructions stored thereon, which, when executed by a processing device, cause the processing device to perform the operations of:
    obtaining input specifying one or more points on an elliptic curve defined over a finite prime field, each point having one or more coordinates in a first coordinate system, at least one point representing a plaintext message and at least one other point representing a cryptographic key;
    selecting a single first non-zero non-random value;
    transforming each point on an elliptic curve from the first coordinate system to a second coordinate system, wherein each coordinate of each transformed point in the second coordinate system has a first representation obtained by multiplying each coordinate of each transformed point in the first coordinate system by of the single first non-random value raised to a non-zero integer power;
    generating a single non-zero random value;
    changing each transformed point in the second coordinate system from the first representation to a second representation, wherein each coordinate of each transformed point in the second representation is obtained by multiplying each coordinate of each transformed point in the first representation by the single random value raised to a non-zero integer power; and
    performing one or more field operations on the second representation of each transformed point to obtain a second representation of ciphered points, and performing an inverse transformation and representation change on the second representation of each ciphered points, to obtain a ciphered message corresponding to the plaintext message.

\* \* \* \* \*